United States Patent
Tsai

(10) Patent No.: US 9,865,143 B2
(45) Date of Patent: Jan. 9, 2018

(54) STATUS DISPLAYING DEVICE AND METHOD THEREOF FOR SOLID-STATE DRIVE

(71) Applicant: Apacer Technology Inc., New Taipei (TW)

(72) Inventor: Meng-Hung Tsai, New Taipei (TW)

(73) Assignee: APACER TECHNOLOGY INC., New Taipei (TW)

( * ) Notice: Subject to any disclaimer, the term of this patent is extended or adjusted under 35 U.S.C. 154(b) by 34 days.

(21) Appl. No.: 14/963,914

(22) Filed: Dec. 9, 2015

(65) Prior Publication Data

US 2017/0092081 A1  Mar. 30, 2017

(30) Foreign Application Priority Data

Sep. 30, 2015 (TW) .............................. 104132100 A

(51) Int. Cl.

| | |
|---|---|
| *G06F 11/30* | (2006.01) |
| *G08B 5/22* | (2006.01) |
| *G06F 13/42* | (2006.01) |
| *G06F 3/06* | (2006.01) |
| *G06F 11/32* | (2006.01) |
| *G06F 11/00* | (2006.01) |
| *G06F 11/10* | (2006.01) |
| *G08B 5/00* | (2006.01) |

(Continued)

(52) U.S. Cl.
CPC .............. *G08B 5/22* (2013.01); *G06F 3/0653* (2013.01); *G06F 11/30* (2013.01); *G06F 11/32* (2013.01); *G06F 13/4282* (2013.01); *G06F 11/00* (2013.01); *G06F 11/006* (2013.01); *G06F 11/07* (2013.01); *G06F 11/1008* (2013.01); *G06F 11/22* (2013.01); *G06F 11/3055* (2013.01); *G06F 11/3058* (2013.01); *G06F 11/3065* (2013.01); *G06F 11/36* (2013.01); *G08B 5/00* (2013.01)

(58) Field of Classification Search
CPC ...... G06F 3/0653; G06F 11/00; G06F 11/006; G06F 11/22; G06F 11/30; G06F 11/07; G06F 11/3065; G06F 11/32; G06F 11/36; G06F 11/3055; G06F 11/1008; G06F 11/3058

See application file for complete search history.

(56) References Cited

U.S. PATENT DOCUMENTS

| 9,229,796 B1 * | 1/2016 | Ma .......................... G06F 11/008 |
| 2008/0059702 A1 * | 3/2008 | Lu ........................... G11B 31/00 711/115 |

(Continued)

FOREIGN PATENT DOCUMENTS

| TW | M315379 U | 7/2007 |
| TW | 201214456 A1 | 4/2012 |

*Primary Examiner* — Benyam Haile
(74) *Attorney, Agent, or Firm* — Li & Cai Intellectual Property (USA) Office

(57) ABSTRACT

The present invention discloses a status displaying device and method thereof for a Solid-State Drive (SSD). The status displaying device may include a non-volatile memory, an emitting unit, a firmware, and a first control unit. A first instruction is generated and transmitted by the firmware. The first instruction is received by the first control unit. The first control unit performs a first operation on the non-volatile memory and controls the emitting unit to have a first emitting behavior according to the first instruction.

9 Claims, 4 Drawing Sheets

(51) Int. Cl.
  *G06F 11/07* (2006.01)
  *G06F 11/36* (2006.01)
  *G06F 11/22* (2006.01)

(56) References Cited

U.S. PATENT DOCUMENTS

2013/0219235 A1* 8/2013 Ohba .................... G11C 29/12
                                                        714/718
2015/0277805 A1* 10/2015 Cheng .................. G06F 3/0658
                                                        711/154

* cited by examiner

STATUS DISPLAYING DEVICE AND METHOD THEREOF FOR SOLID-STATE DRIVE

BACKGROUND OF THE INVENTION

1. Field of the Invention

The instant disclosure relates to a status displaying device; in particular, to a status displaying device displaying status of the Solid-State Drive (SSD) via the emitting unit and a displaying method thereof.

2. Description of Related Art

Self-Monitoring, Analysis and Reporting Technology (S. M. A. R. T.) is an internal monitoring function of the hard disk and the solid state drive, which helps the user to monitor the condition of an SSD, such as the accessing life-time, the reading/writing error rate, the temperature, the erase error or the like. The S.M.A.R.T. information can be read via the application chosen by each manufacturer and then be displayed on screen. Based on the displayed S.M.A.R.T. information, the user can easily learn the current status of the SSD.

However, in the above method, there are three disadvantages.

1. As the computer host connected to the SSD does not comprise a screen, the S.M.A.R.T. information of the SSD cannot be learned by the user.

2. If the above application is not installed by the user, the S.M.A.R.T. information of the SSD cannot be read.

3. S.M.A.R.T. information of the SSD needs to be read by the computer host comprising a screen and installed with the corresponding application. In addition, usually, the S.M.A.R.T. information of the SSD would be read only when the user notices there may be a problem of the SSD. In other words, the current SSD cannot actively inform the user of the monitored S.M.A.R.T. information of the SSD.

Thus, the instant disclosure provides a status displaying device and method for an SSD to solve the above problems.

SUMMARY OF THE INVENTION

The instant disclosure solves the situation where the user is unable to obtain the S.M.A.R.T. information of the SSD because the host machine connected to the SSD does not have a screen.

The instant disclosure also solves the situation where the S.M.A.R.T. information of the SSD cannot be read because the host machine has not installed applications.

The instant disclosure also solves the situation where the SSD cannot actively inform the user of the obtained S.M.A.R.T. information.

Thus, the instant disclosure provides a status displaying method for a Solid-State Drive (SSD) used in a status displaying device for an SSD. The status displaying device comprises a non-volatile memory, a firmware and a first control unit. The status displaying method comprises: transmitting a first instruction to the first control unit; executing a first operation to the non-volatile memory according to the first instruction; and controlling an emitting unit to operate a first emitting behavior according to the first instruction. The first emitting behavior is controlled via a transmission interface.

In one embodiment of the instant disclosure, the above status displaying method further comprises: generating the first instruction and transmitting the first instruction to the first control unit via the firmware.

In one embodiment of the instant disclosure, in the above status displaying method, the first instruction is a reading instruction and the first operation is a reading operation.

In one embodiment of the instant disclosure, in the above status displaying method, the first instruction is a writing instruction and the first operation is a writing operation.

In one embodiment of the instant disclosure, in the above status displaying method, the emitting unit comprises a light emitting diode.

In one embodiment of the instant disclosure, in the above status displaying method, the transmission interface comprises a universal asynchronous receiver/transmitter (UART), a serial peripheral interface (SPI) or an Inter-Integrated Circuit (I2C).

The instant disclosure further provides a status displaying method for a Solid-State Drive (SSD) used in a status displaying device for an SSD. The status displaying device comprises a non-volatile memory, a firmware and a first control unit. The status displaying method comprising: transmitting a first instruction to the first control unit; executing a first operation to the non-volatile memory according to the first instruction; transmitting the first instruction to a second control unit; and controlling an emitting unit to operate a first emitting behavior according to the first instruction. The first emitting behavior is controlled via a transmission interface.

In one embodiment of the instant disclosure, the above status displaying method further comprises: generating the first instruction and transmitting the first instruction to the first control unit via the firmware.

In one embodiment of the instant disclosure, in the above status displaying method, the first instruction is a reading instruction and the first operation is a reading operation.

In one embodiment of the instant disclosure, in the above status displaying method, the first instruction is a reading instruction and the first operation is a reading operation.

In one embodiment of the instant disclosure, in the above status displaying method, the emitting unit comprises a light emitting diode.

In one embodiment of the instant disclosure, in the above status displaying method, the transmission interface comprises a universal asynchronous receiver/transmitter (UART), a serial peripheral interface (SPI) or an Inter-Integrated Circuit (I2C).

In one embodiment of the instant disclosure, in the above status displaying method, the second control unit comprises a microcontroller.

The instant disclosure further provides a status displaying device for a Solid-State Drive (SSD). The status displaying device comprises a non-volatile memory, a firmware unit, an emitting unit and a first control unit. The firmware generates a first instruction and transmits the first instruction. The first control unit receives the first instruction, executes a first operation to the non-volatile memory, and controls the emitting unit to operate a first emitting behavior according to the first instruction.

In one embodiment of the instant disclosure, in the above status displaying device, the firmware transmits a second instruction to the first control unit according to a hardware testing message, and the first control unit controls the emitting unit to operate a second emitting behavior according to the second instruction.

In one embodiment of the instant disclosure, the above status displaying device further comprises a second control unit. The firmware transmits a second instruction to the second control unit according to a hardware testing message.

The second control unit controls the emitting unit to operate a second emitting behavior according to the second instruction.

In one embodiment of the instant disclosure, in the above status displaying device, the firmware transmits a second instruction to the first control unit according to a connectivity fault message, and the first control unit controls the emitting unit to operate a second emitting behavior according to the second instruction.

In one embodiment of the instant disclosure, the above status displaying device further comprises a second control unit. The firmware transmits a second instruction to the second control unit according to a connectivity fault message. The second control unit controls the emitting unit to operate a second emitting behavior according to the second instruction.

In one embodiment of the instant disclosure, in the above status displaying device, the firmware transmits a second instruction to the first control unit according to a standby message, and the first control unit controls the emitting unit to operate a second emitting behavior according to the second instruction.

In one embodiment of the instant disclosure, the above status displaying device further comprises a second control unit. The firmware transmits a second instruction to the second control unit according to a standby message, and the second control unit controls the emitting unit to operate a second emitting behavior according to the second instruction.

In one embodiment of the instant disclosure, in the above status displaying device, the first emitting behavior is controlled via a transmission interface, and the transmission interface comprises a universal asynchronous receiver/transmitter (UART), a serial peripheral interface (SPI) or an Inter-Integrated Circuit (I2C).

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In addition, for easy instruction, similar reference numbers or symbols refer like elements.

Figure 1:
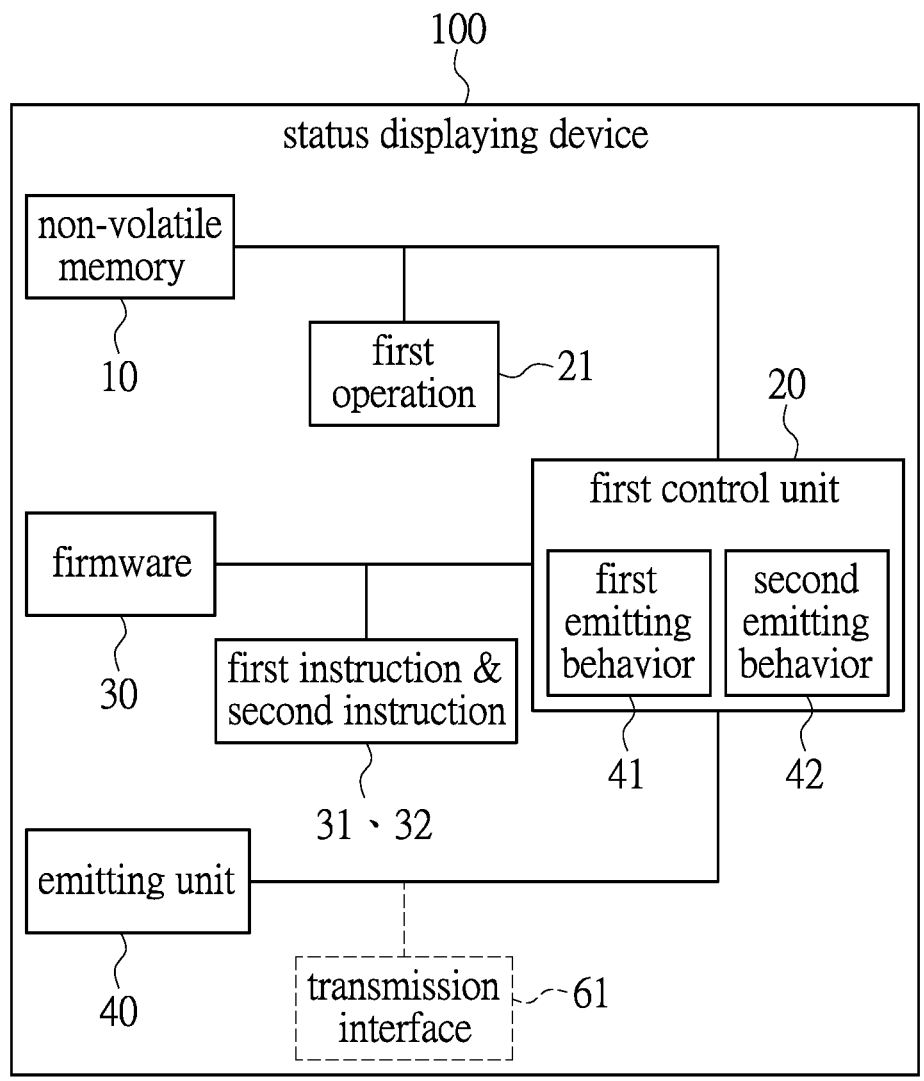
FIG. 1 shows a block diagram of a status displaying device of one embodiment of the instant disclosure.

Please refer to FIG. 1. FIG. 1 shows a block diagram of a status displaying device of one embodiment of the instant disclosure. As shown in FIG. 1, the status displaying device 100 for an SSD comprises a non-volatile memory 10, a first control unit 20, a firmware 30 and an emitting unit 40. The non-volatile memory 10 can be a flash memory of the SSD, which the data can be written in and removed from. The first control unit 20 can be a controller of the SSD. The emitting unit 40 is electrically connected to the first control unit 20 comprising a light emitting diode. The non-volatile memory 10 and the first control unit 20 are configured in the SSD. The firmware 30 is the software installed in the SSD, which is program code stored in the non-volatile memory 10 and can be executed via the first control unit 20. The emitting unit 40 is configured to surround the SSD.

The SSD can be connected to a computer host via a SATA cable. The computer host transmits a data writing instruction to the firmware 30 via the SATA cable, when the computer host wants to write in the data to the SSD. The firmware 30 transmits at least one first instruction 31 to the first control unit 20 according to the firmware, the first control unit 20 executes the first operation 21 to the non-volatile memory 10, and the first instruction 31 is a writing instruction and the first operation 21 is a direct writing operation to the non-volatile memory 10 under this situation.

At the same time when the first operation 21 is executed, the first control unit 20 can also control the emitting unit 40 to operate the first emitting behavior 41 according to the first instruction 31, wherein the first emitting behavior 41 can be an emitting behavior designed based on the writing instruction. For example, to make the emitting unit 40 blink three times per second, or to display different colors and color levels of light based on different emitting powers of light.

A data writing instruction is used for illustrating the above embodiment, but a data reading instruction can be also used in the instant disclosure. In this case, the difference is that the first instruction 31 is a reading instruction, and the first operation 21 is a direct reading operation to the non-volatile memory 10 and the first emitting behavior 41 predetermined for this reading instruction. The first emitting behavior 41 is controlled via a transmission interface 61, wherein the transmission interface 61 can be UART, SPI or I2C.

In this embodiment, it is preferred that, the emitting unit 40 emits lights according to the hardware testing message (S.M.A.R.T.). In detail, the hardware testing message detected in the firmware can be the accessing lifetime of the SSD, the reading/writing error rate, the temperature and the erase error, wherein a second emitting behavior 42 is defined in respect to different hardware testing message. Thereby, the user just needs to observe the emitting behavior of the emitting unit 40 to obtain the current status of the SSD.

In this embodiment, the emitting unit 40 not only displays the hardware testing message, but can also display the other information of the firmware 30, such as a standby message or a connectivity fault message. The standby message represents a status that means the SSD is currently not operating, and the connectivity fault message represents a status that means the signal connecting line between the computer host and the SSD does not provide an effective connection.

Figure 2:
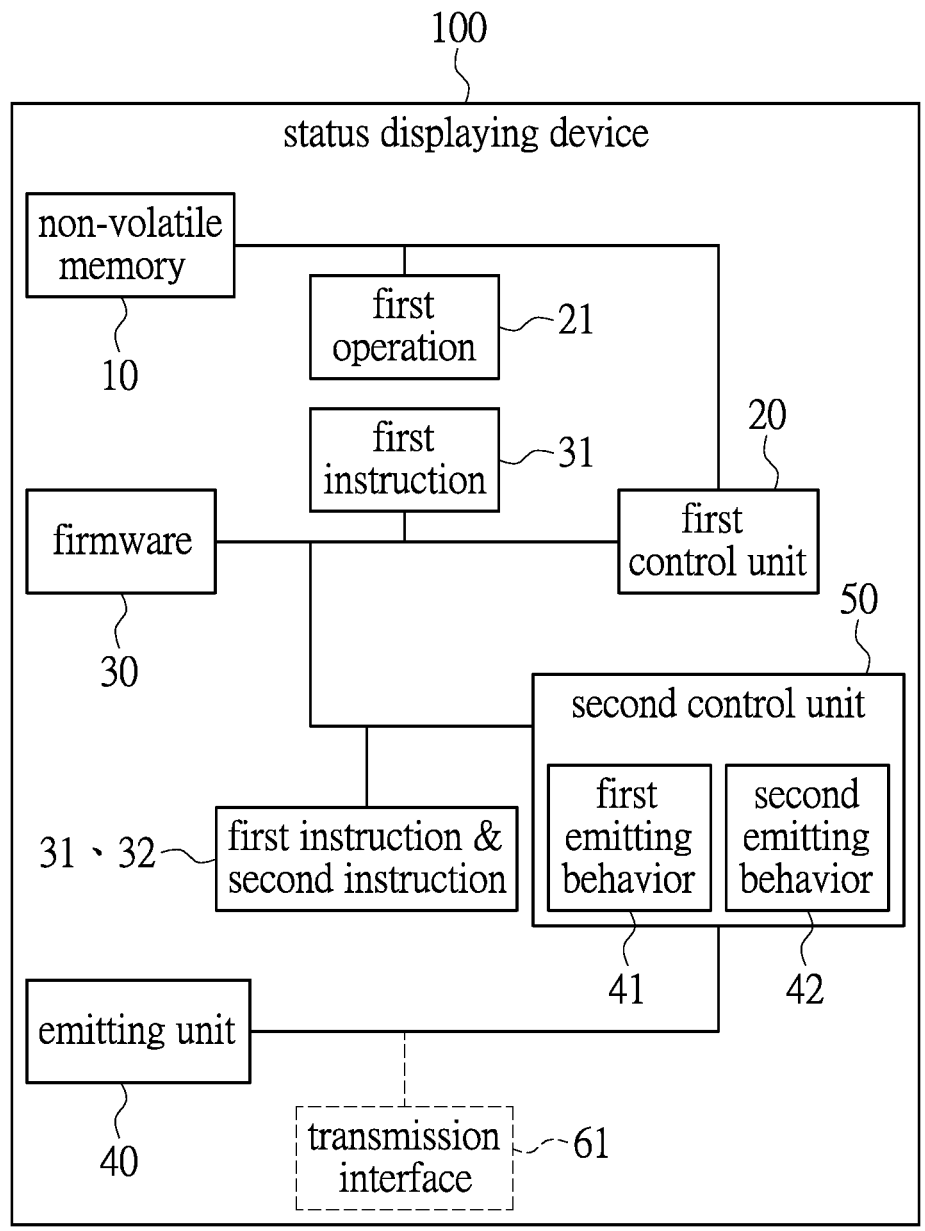
FIG. 2 shows a block diagram of a status displaying device of the first embodiment of the instant disclosure.

FIG. 2 shows a block diagram of a status displaying device of the first embodiment of the instant disclosure. In conjunction with FIGS. 1 and 2, the status displaying device in this embodiment further comprises a second control unit 50, wherein the second control unit 50 is a microcontroller providing a memory function and a computing function.

In this embodiment, the operation for reading/writing of the non-volatile memory 10 is the same as the above embodiment, and thus the redundant information is not repeated. The difference between this embodiment and the above embodiment is that, in this embodiment the firmware 30 can transmit the first instruction 31 comprising the reading/writing instruction to the second control unit 50, and the second control unit 50 controls the emitting unit 40 to operate the first emitting behavior 41 according to the first instruction 31. Additionally, the firmware 30 can also transmit the second instruction 32 related to the hardware testing message, the error connecting information or the standby message to the second control unit 50, and the second control unit 50 controls the emitting unit 40 to operate the second emitting behavior 42.

In the above embodiment, the first control unit 20 operates the reading/writing of the non-volatile memory 10 and also controls the light emitting of the emitting unit 40, which decreases the accessing rate during the reading/writing to the SSD. However, in this embodiment, there is the second control unit 50 controlling the light emitting operation of the emitting unit 40, such that the operation load of the first control unit 20 can be effectively reduced and thus the reading/writing accessing rate of the SSD can be increased. In addition, the second control unit 50 has a storing device that stores different emitting behaviors with respect to different instruction or connectivity fault message, and thus there are more kinds of first emitting behavior 41 and second emitting behavior 42 in this embodiment. For example, there can be emitting behaviors with different light colors and blinking frequency.

Figure 3:
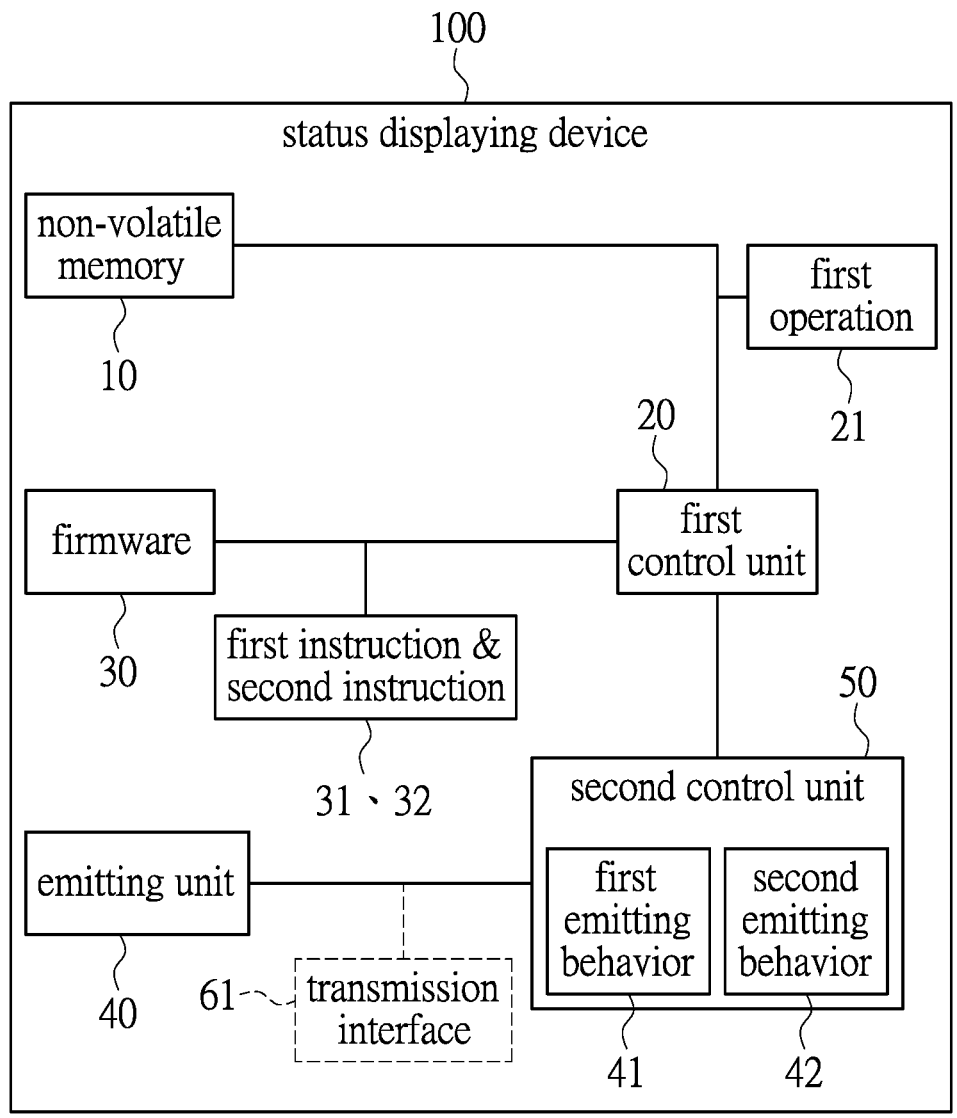
FIG. 3 shows a block diagram of a status displaying device of the second embodiment of the instant disclosure.

FIG. 3 shows a block diagram of a status displaying device of the second embodiment of the instant disclosure. In conjunction with FIGS. 1-3, in this embodiment, the firmware 30 can transmit the first instruction 31 to the first control unit 20. As the first control unit 20 receives the first instruction 31, it executes the first operation 31 to the non-volatile memory 10 according to the first instruction 31 and simultaneously transmits the first instruction 31 to the second control unit 20. After the second control unit 50 receives the first instruction 31, it controls the emitting unit 40 to operate the first emitting behavior 41, wherein the first instruction 31 comprises a reading instruction or a writing instruction of the non-volatile memory 10.

On the other hand, the firmware 30 can also transmit the second instruction 32 to the first control unit 20, and the first control unit 20 transmits the second instruction 32 to the second control unit 50. At this moment, the second control unit 50 controls the emitting unit 40 to operate the second emitting behavior 42, wherein the second instruction 32 comprises the hardware testing message, the standby message or the error connecting information detected by the firmware 30. The related working mechanism and results have been described in the above embodiment, and thus the redundant information is not repeated.

Figure 4:
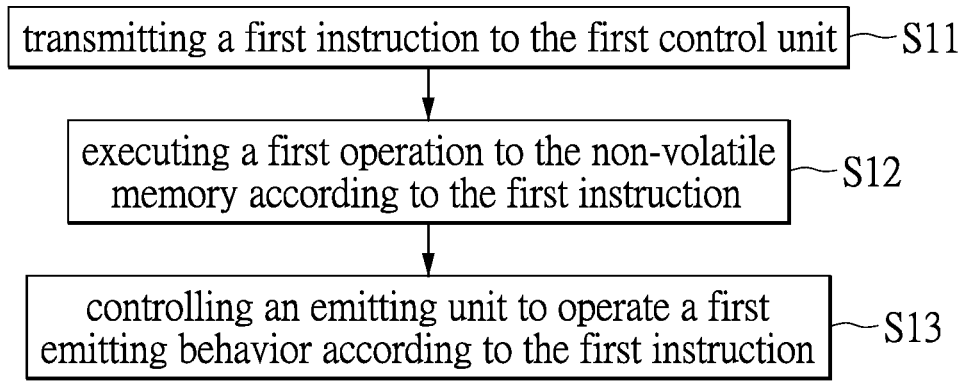
FIG. 4 shows a flow chart of a status displaying method of third embodiment of the instant disclosure.

FIG. 4 shows a flow chart of a status displaying method of third embodiment of the instant disclosure. A status displaying method for an SSD is disclosed in this embodiment, which can be used in an SSD comprising a non-volatile memory, a firmware and a first control unit, and the status displaying method comprises the following steps:

The step S11 is transmitting a first instruction to the first control unit, wherein the first instruction is generated via a firmware and transmitted.

The step S12 is executing a first operation to the non-volatile memory according to the first instruction.

The step S13 is controlling an emitting unit to operate a first emitting behavior according to the first instruction, wherein the first emitting behavior is controlled via a transmission interface, the emitting unit comprises an LED and the transmission interface comprises the UART, SPI or I2C.

More precisely, if the first instruction is a reading instruction the first operation would be a reading operation, and if the first instruction is a writing instruction the first operation would be a writing operation.

Figure 5:
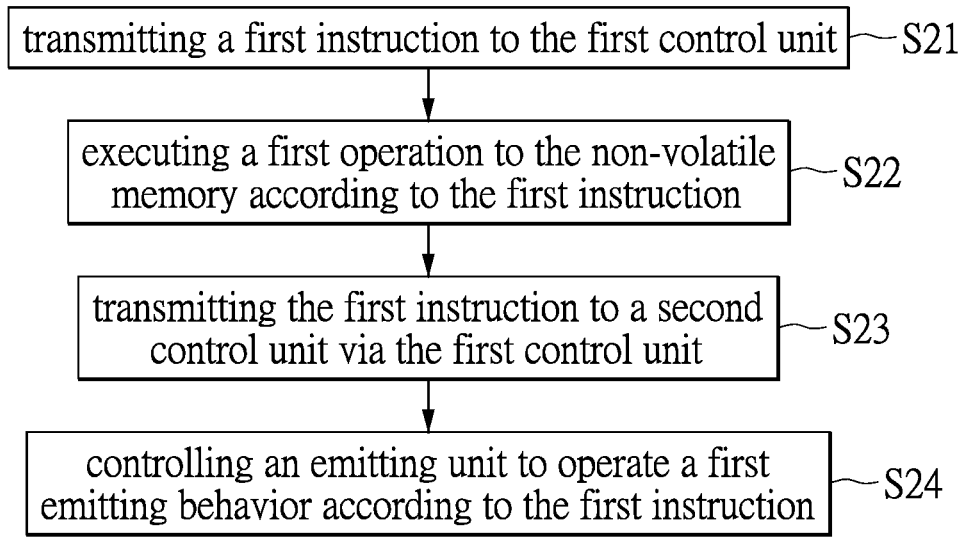
FIG. 5 shows a flow chart of a status displaying method of fourth embodiment of the instant disclosure.

FIG. 5 shows a flow chart of a status displaying method of fourth embodiment of the instant disclosure. The status displaying method for an SSD is used in an SSD comprising a status displaying method, a firmware and a first control unit, and the first control unit comprises the following steps:

The step S21 is transmitting a first instruction to the first control unit, wherein the first instruction is generated via a firmware and transmitted.

The step S22 is executing a first operation to the non-volatile memory according to the first instruction.

The step S23 is transmitting the first instruction to a second control unit via the first control unit, wherein the second control unit comprises a microcontroller.

The step S24 is controlling an emitting unit to operate a first emitting behavior according to the first instruction, wherein the first emitting behavior is controlled via a transmission interface, the emitting unit comprises an LED and the transmission interface comprises the UART, SPI or I2C.

More precisely, in the steps S21 and S22, if the first instruction is a reading instruction the first operation would be a reading operation, and if the first instruction is a writing instruction the first operation would be a writing operation.

Via the above the status displaying device and method provided by the instant disclosure, even if the computer host connected to the SSD does not comprise a screen or does not install the corresponding application, the user still can learn the status of the SSD via the emitting unit of the SSD and whether there are problems based on the obtained S.M.A.R.T. information.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A status displaying method for a Solid-State Drive (SSD) used in a status displaying device for an SSD, the status displaying device comprising a non-volatile memory, a firmware, a first control unit and a second control unit, the status displaying method comprising:
through the firmware, generating and transmitting a first instruction to the first control unit and the second control unit;
through the first control unit, executing a first operation to the non-volatile memory according to the first instruction;
through the firmware, transmitting a second instruction to the second control unit according to a hardware testing message; and
through the second control unit, controlling an emitting unit to operate a first emitting behavior according to the first instruction or to operate a second emitting behavior according to the second instruction;
wherein the first emitting behavior is controlled via a transmission interface.

2. The status displaying method according to claim 1, wherein the first instruction is a reading instruction and the first operation is a reading operation.

3. The status displaying method according to claim 1, wherein the first instruction is a writing instruction and the first operation is a writing operation.

4. The status displaying method according to claim 1, wherein the emitting unit comprises a light emitting diode.

5. The status displaying method according to claim 1, wherein the transmission interface comprises a universal asynchronous receiver/transmitter (UART), a serial peripheral interface (SPI) or an Inter-Integrated Circuit (I2C).

6. The status displaying method according to claim 1, wherein the second control unit comprises a microcontroller.

7. A status displaying device for a Solid-State Drive (SSD), comprising:
   a non-volatile memory;
   an emitting unit;
   a firmware, generating a first instruction and transmitting the first instruction, and according to a hardware testing message generating a second instruction and transmitting the second instruction;
   a first control unit, receiving the first instruction, executing a first operation to the non-volatile memory, and controlling the emitting unit to operate a first emitting behavior according to the first instruction; and
   a second control unit, receiving the second instruction, and controlling the emitting unit to operate a second emitting behavior according to the second instruction.

8. The status displaying device according to claim 7, wherein the firmware transmits the second instruction to the second control unit further according to a connectivity fault message, and the second control unit controls the emitting unit to operate the second emitting behavior according to the second instruction.

9. The status displaying device according to claim 7, wherein the firmware transmits the second instruction to the second control unit further according to a standby message, and the second control unit controls the emitting unit to operate the second emitting behavior according to the second instruction.

* * * * *